Figure 1:
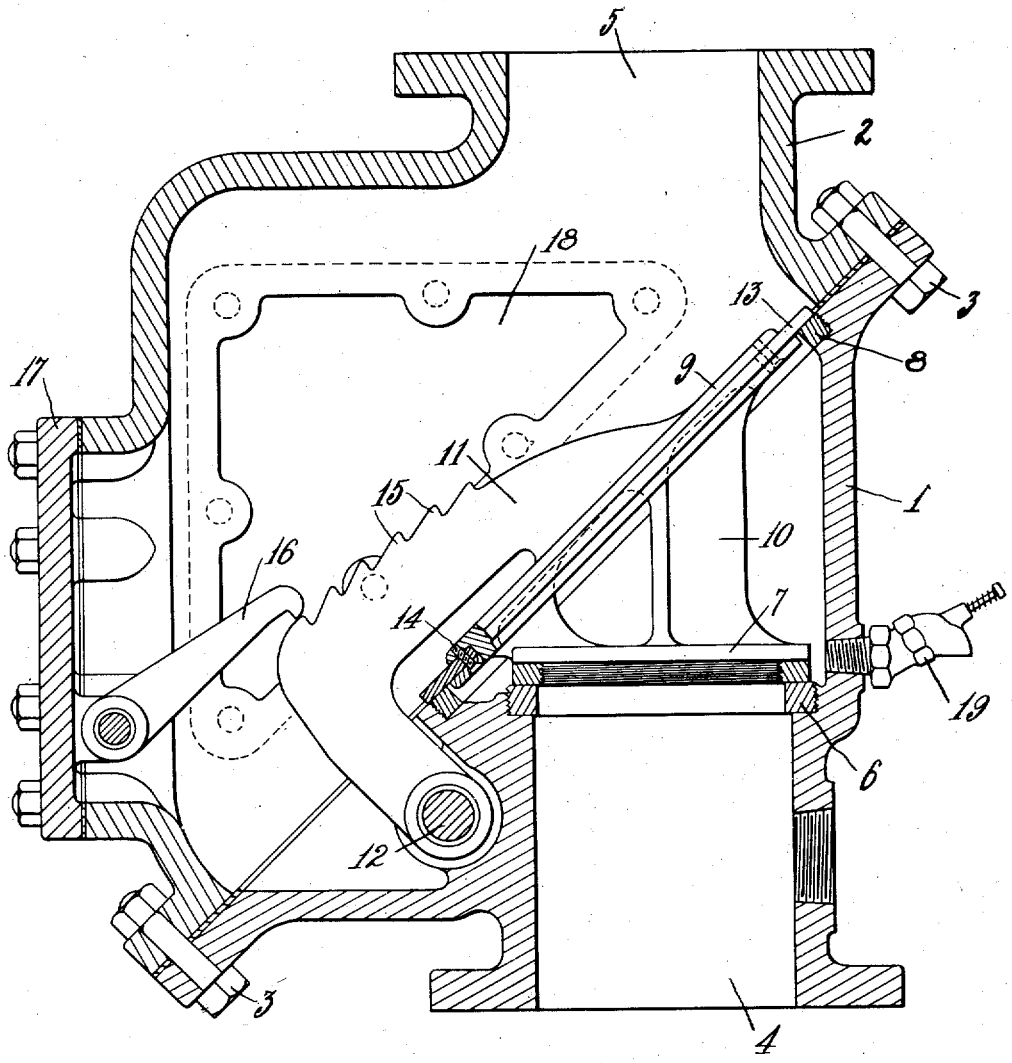

May 5, 1925. Re. 16,060

A. J. LOEPSINGER

DRY PIPE VALVE

Original Filed Nov. 17, 1910 3 Sheets-Sheet 1

Inventor:
Albert J. Loepsinger,
By James H. Thurston,
Attorney:

May 5, 1925. Re. 16,060

A. J. LOEPSINGER

DRY PIPE VALVE

Original Filed Nov. 17, 1910 3 Sheets-Sheet 2

Inventor:
Albert J. Loepsinger
By James H. Thurston
Attorney:

May 5, 1925. Re. 16,060

A. J. LOEPSINGER

DRY PIPE VALVE

Original Filed Nov. 17, 1910 3 Sheets-Sheet 3

Inventor
Albert J. Loepsinger
By James H. Thurston
Attorney.

Reissued May 5, 1925. Re. 16,060

UNITED STATES PATENT OFFICE.

ALBERT J. LOEPSINGER, OF CRANSTON, RHODE ISLAND, ASSIGNOR TO GENERAL FIRE EXTINGUISHER COMPANY, OF NEW YORK, N. Y., A CORPORATION OF NEW YORK.

DRY-PIPE VALVE.

Original No. 1,196,874, dated September 5, 1916, Serial No. 592,810, filed November 17, 1910. Application for reissue filed July 15, 1918. Serial No. 245,110.

*To all whom it may concern:*

Be it known that I, ALBERT J. LOEPSINGER, of the city of Cranston, and the county of Providence, and State of Rhode Island, have invented certain new and useful Improvements in Dry-Pipe Valves; and I do hereby declare the following specification, taken in connection with the accompanying drawings, forming a part of the same, to be a full, clear, and exact description thereof.

Dry pipe valves for use in automatic sprinkler systems comprise a water valve and an air-valve, and are ordinarily so constructed that the water-valve will be held closed against the water-pressure in the supply-pipe by air in the distributing pipes at a pressure materially less than the pressure of the water in the supply-pipe. In some cases the mechanical advantage necessary to secure this result is obtained by making the air-valve, that is, the valve which is subjected to the air-pressure in the distributing pipes, of greater area than the water-valve; in other cases such mechanical advantage is obtained by the interposition of a lever or a system of levers between the air-valve and the water-valve.

In both cases the dry-pipe valve structure is necessarily large and cumbersome and of such a size that the valve cannot in many cases for lack of room be conveniently installed in the place desired. In the case of the differential valve the undue size is due to the presence of the lever or levers and necessary interposition thereof between the air-valve and the water-valve. Both kinds of dry pipe valves are also, by reason of their construction, necessarily expensive, and of such cost as to in many cases preclude their introduction.

The object of the present invention is to produce a dry pipe valve which shall be simple and correspondingly cheap to construct, and which shall also be comparatively small in size, and so that the structure as a whole will occupy a materially less space than the dry pipe valves as heretofore constructed.

To that end the invention consists primarily in so arranging the air valve and the water valve that each of them closes the waterway when seated, and in mounting said valves to swing about a common center located outside of the waterway and with the axis of the air valve located at a greater distance from said common center than the axis of the water valve, whereby there will be a correspondingly greater leverage through which the air pressure acts, as compared with the leverage through which the water pressure acts.

Two forms of valves embodying the invention are shown in the drawings. In the first form the air-valve and the water-valve, together with the seats therefor, are arranged in different planes and at an angle to each other. In the other form the air-valve and the water-valve are arranged in the same plane, but said valves and the seats therefor are arranged eccentric to each other. In both of these forms of valves it will be seen that the air-valve is of larger diameter and thus has a greater area than the water-valve, and so that in each form of valve there is available for holding the water-valve closed, not only differential leverage, but also the differential area of the air-valve.

The invention further consists in certain constructions, arrangements and combinations of parts hereinafter described and claimed.

Figure 2:
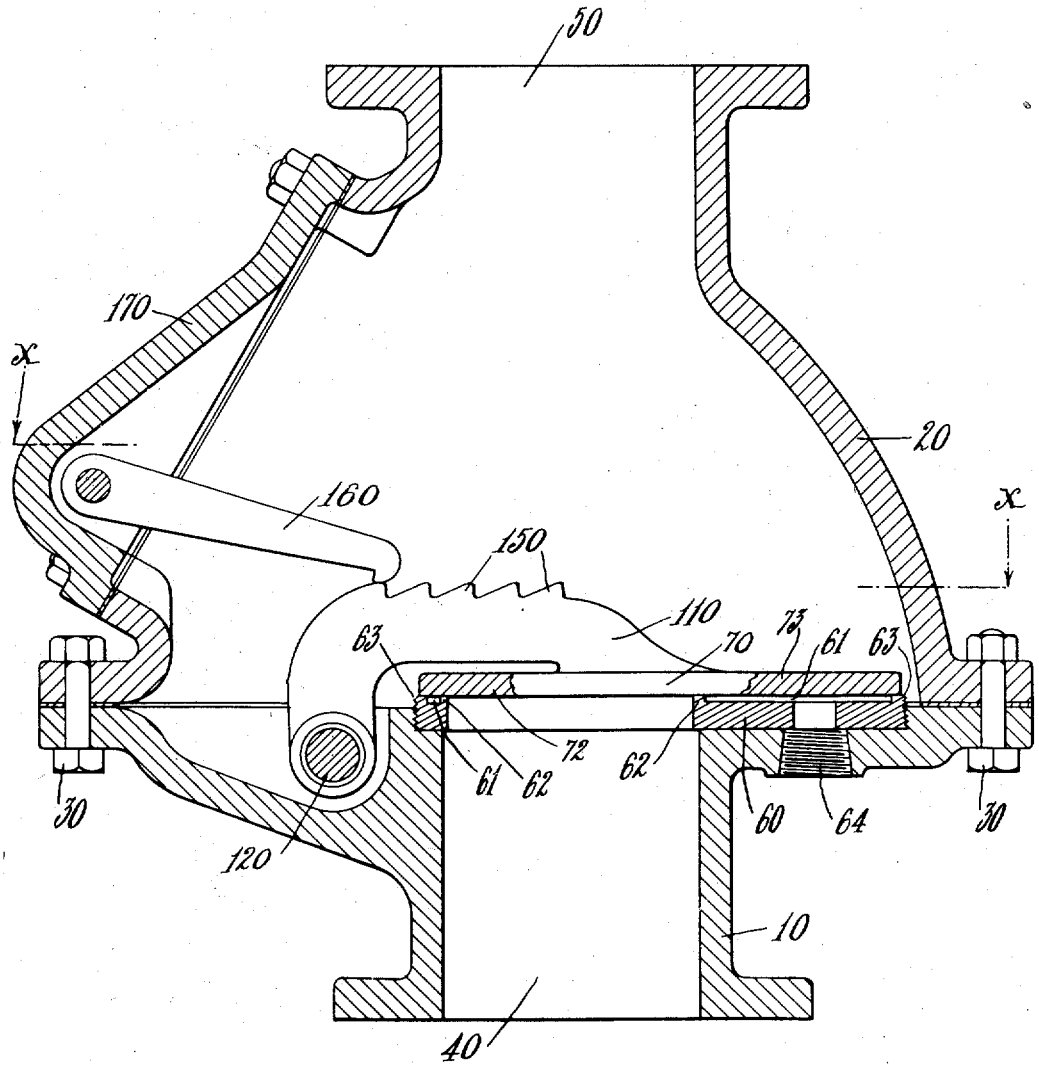
Figure 3:
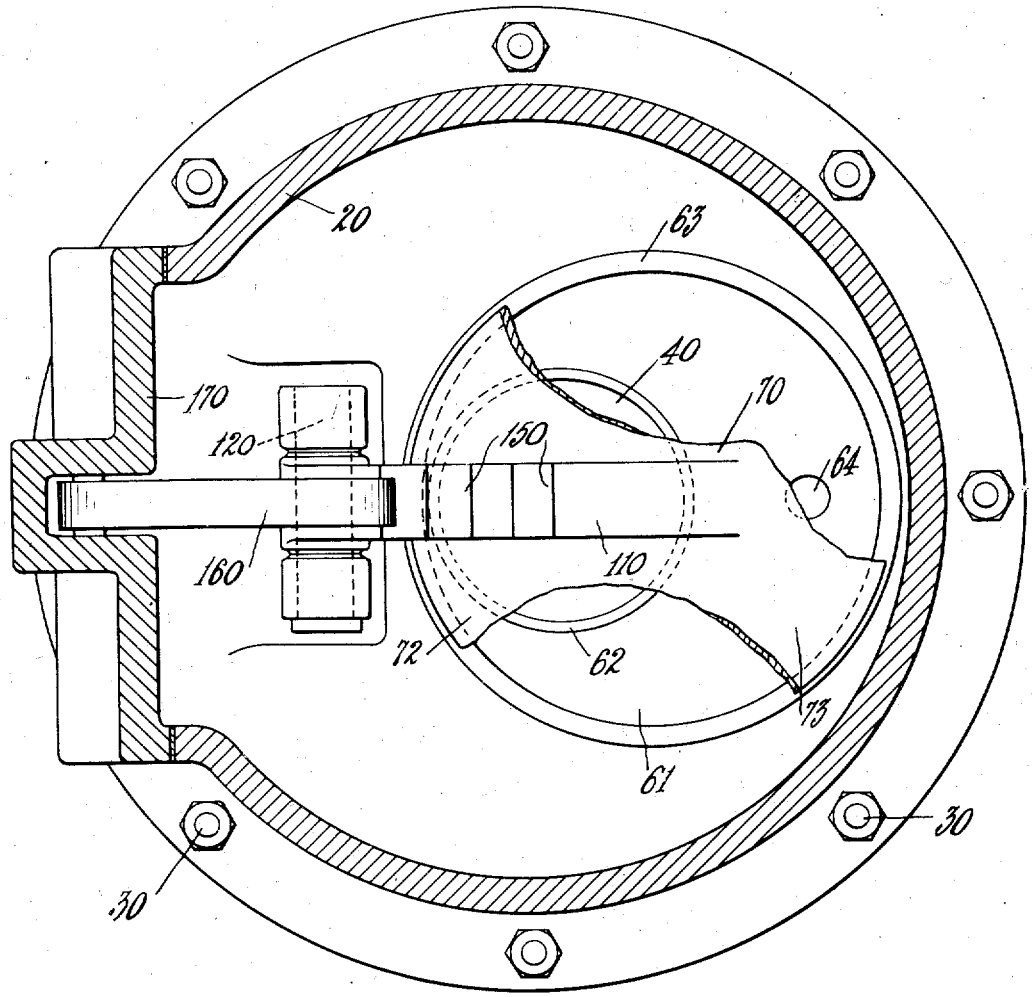

Referring to the drawings, Figure 1 is a longitudinal sectional view of one form of dry pipe valve embodying the invention; Fig. 2 is a corresponding sectional view of another form of dry pipe valve embodying the invention; and Fig. 3 is a horizontal section on the line $x$—$x$ of Fig. 2.

Referring to the construction shown in Fig. 1, the valve-casing comprises two parts 1 and 2, the abutting faces of which are formed at an angle to the axis of the waterway, as shown, the two parts being secured together by bolts 3. The part 1 of the valve casing is provided with an inlet opening 4 adapted to communicate with the water supply-pipe, and the part 2 is provided with an outlet opening 5 adapted to communicate with the riser of a sprinkler system. The inlet opening is provided with a valve-seat 6 for the water-valve 7, while the part 1 of the valve-casing is provided with an angularly arranged valve-seat 8 for the air-valve 9. Each of these valve seats surrounds the waterway, which is therefore closed by both valves when seated.

The water-valve 7 and the air-valve 9 are arranged at a corresponding angle to each other, and said water-valve and air-valve are connected together by a webbed bridge-piece 10, whereby they are adapted to transmit pressure from one to the other when seated. The two valves thus connected are carried by a swinging arm 11, one end of which is secured to the air-valve, the other end of said arm being pivoted to the part 1 of the valve-casing by a pivot-pin 12. The arm 11, in the construction shown, is bent so as to bring the pivot 12 below the water-valve 8. This construction of the arm 11 and location of the pivot 12, not only insures that the distance from the pivot to the axis of the air-valve shall be greater than the distance from the pivot to the axis of the water-valve, but also serves to reduce the space required for the valves to swing in, thereby correspondingly reducing the size of the valve casing.

The air-valve 9 is preferably provided with an annular lip of flexible or yielding material 13, which may be secured to the main body of said air-valve by screws 14, said lip 13 constituting the part which seats upon the valve-seat 8. The employment of such yielding portion 13 serves to facilitate the proper seating of the air-valve and water-valve, respectively.

Preferably the arm 11 is provided with a series of teeth 15 adapted to be engaged by a pivoted hook or latch 16 for the purpose of holding the valve structure in open position and preventing it from accidentally closing again after it has once opened or partially opened. The valve casing is provided with a hand hole cover 17, through which the valve structure may be inserted in or removed from the valve casing, and in the construction shown the hook or latch 16 is pivoted to this hand-hole cover. Another hand-hole cover 18 indicated by dotted lines is provided to permit access to the interior of the valve casing for the purpose of cleaning the valve-seats and resetting the valves. A drip opening communicates with the intermediate chamber between the two valve-seats for the purpose of taking care of leakage past either the water-valve or the air-valve, said drip opening being preferably provided with the usual drip-valve 19, as shown.

Referring now to the construction shown in Fig. 2, the valve casing likewise comprises two parts 10 and 20 secured together by bolts 30, the abutting faces of the two parts being in this case arranged at right angles to the axis of the water-way. The part 10 of the valve-casing is provided with an inlet opening 40 adapted to communicate with the water supply pipe, and the part 20 is provided with an outlet opening 50 adapted to communicate with the riser of a sprinkler system. In this construction the water-valve and the air-valve are arranged in the same plane, and in the form shown the two valves are formed integral with each other and constitute a single valve-plate having different seating surfaces, as hereinafter explained. The two valve-seats for said water-valve and air-valve are likewise consolidated, being both formed on a single seat-ring 60, as shown. Said seat-ring 60 is provided with a groove or recess 61. Said groove or recess, instead of being formed concentric with the axis of the water-way, is formed eccentric, as shown. By this construction two valve-seats are formed, one valve-seat 62,—the valve-seat for the water-valve,—being concentric with the axis of the water-way, and the other valve-seat 63,—the valve-seat for the air-valve,—being eccentric to the axis of the water-way. The valve-plate 70 above referred to overlies both of said valve-seats, and that portion 72 of said valve-plate which overlies and seats upon the valve-seat 62 constitutes the water-valve, while that portion 73 of said valve-plate which overlies and seats upon the valve-seat 63 constitutes the air-valve. A drip opening 64, which may be provided with the usual drip-valve, communicates with the recess 61 and thus with the intermediate chamber located between the two valve-seats, for the purpose of taking care of leakage past either the water-valve or the air-valve.

The valve-plate 70 comprising both the water-valve and the air-valve is carried by a swinging arm 110, one end of which is secured to said valve-plate, the other end of said arm being pivoted to the part 10 of the valve-casing by a pivot-pin 120. The arm 110, in the construction shown, is bent and so as to bring the pivot 120 below the valve-plate. This construction of the arm 110 and location of the pivot 120 serves to reduce the space required for the valve-plate to swing in, thereby correspondingly reducing the size of the valve-casing.

Preferably the arm 110 is provided with a series of serrations 150 adapted to be engaged by a pivoted hook or latch 160, for the purpose of holding the valve-plate in open position and preventing it from accidentally closing again after it has once opened or partially opened. The valve-casing is provided with a hand-hole cover 170 through which the valve structure may be inserted in, or removed from, the valve casing, and in the construction shown the hook or latch 160 is pivoted to this hand-hole cover.

With each of the constructions above described, when the air-valve and water-valve are seated and air-pressure is pumped up in the sprinkler system, the water-valve will be held closed by the air-pressure in the system acting upon the air-valve, and with each of said constructions, as will be understood, the air-pressure required to hold the water-valve closed may be materially less than the water-pressure which is acting on the water-valve and tending to open the same.

When the air-pressure in the system becomes reduced below the predetermined point, as by the opening of one or more sprinklers, and so that such air-pressure is no longer able to hold the water-valve closed, the water-pressure acting upon the water-valve will serve to open the same, and in thus opening, the water-valve and the air-valve will both be caused to swing about a common center and in so swinging will be moved to a position wholly to one side of the water-way, and so as to leave a free and unobstructed passage for the water in flowing to the sprinkler system. As the water-valve and air-valve are thus swung about a common center, the hook or latch 16 automatically engages successively the teeth 15, and so that said latch will serve to hold the valves in their open position and to prevent their being accidentally closed.

In both of the constructions shown, as will be seen, the air-valve and the water-valve are connected together and mounted to swing about a common center, and in both constructions the axis of the air-valve is at a greater distance from said common center than the axis of the water-valve, and so that consequently there will be a correspondingly greater leverage through which the air-pressure acts, as compared with the leverage through which the water-pressure acts, and so that by reason of the greater leverage for the air-valve thus provided the water-valve will be held closed by an air-pressure in the system correspondingly less than the water-pressure acting on said water-valve and tending to open the same.

While in both of the constructions shown the area of the air-valve subjected to the air-pressure in the system is materially larger than the area of the water-valve subjected to the water-pressure in the supply-pipe, and so that there is thus present, to assist in holding the water-valve closed, such differential area of the air-valve, in addition to the differential leverage referred to, it will be seen that by reason of such differential leverage the area of the air-valve may be materially lessened, as compared with what would be required if such differential leverage were not present. As will be seen, the size of the valve structure as a whole, including the valve-casing, is accordingly much less than has formerly been required, and so that such valve structure may be installed in places where prior valve structures could not, by reason of their size, be located.

It will be further seen that by the location of the common center for the air-valve and water valve below the valve-seat for the water-valve, the space required for the valve or valves to swing in is lessened and the size of the valve structure as a whole still further reduced.

It will further be seen that with the constructions shown and described the employment of levers interposed between the air-valve and the water-valve is dispensed with, thereby not only reducing the size of the valve structure, but materially reducing the cost and expense thereof.

What I claim as my invention and desire to secure by Letters Patent is:

1. A dry pipe valve comprising an air valve and a water valve arranged to close the waterway at each valve and transmit pressure from one to the other when seated and valve-carrying means mounted outside of the waterway to swing about a center with respect to which the air valve has greater leverage than the water valve.

2. A dry pipe valve comprising an air valve and a water valve arranged to close the waterway at each valve and transmit pressure from one to the other when seated, the area of the air valve being greater than that of the water valve, and valve-carrying means mounted outside of the waterway to swing about a center with respect to which the air valve has greater leverage than the water valve.

3. A dry pipe valve comprising an air valve and a water valve arranged to close the waterway at each valve and transmit pressure from one to the other when seated, said valves being arranged at an oblique angle to each other, and valve-carrying means located outside of the waterway and mounted to swing about a center with respect to which the air valve has greater leverage than the water valve.

4. A dry pipe valve comprising a casing, an arm pivotally mounted therein, outside of the waterway, an air valve carried by said arm, a water valve carried by the air valve, and valve seats at each of which the waterway is closed by the corresponding valve when seated, the pivotal axis of said arm being so located that the air valve has greater leverage than the water valve.

5. A dry pipe valve comprising a casing, an arm pivotally mounted therein, outside of the waterway, an air valve carried by said arm, a water valve carried by the air valve at an oblique angle thereto, and valve seats at each of which the waterway is closed by the corresponding valve when seated, the pivotal axis of said arm being so located that the air valve has greater leverage than the water valve.

6. A dry pipe valve comprising a casing, an arm pivotally mounted therein, an air valve carried by said arm, a water valve carried by the air valve at an oblique angle thereto, and valve seats at each of which the waterway is closed by the corresponding valve when seated, said arm being connected to the air valve on the outlet side of the air valve seat and having its pivotal axis located on the inlet side of the plane of the water valve seat, out of but adjacent to the waterway.

7. A dry pipe valve comprising a casing containing an air valve seat arranged at an inclination with respect to the waterway and a water valve seat extending transversely with respect to the waterway, said seats being located one beyond the other with the waterway passing through both of them, a pivotally-mounted arm located outside of the valve seats and movable toward and away from the latter, an air valve carried by said arm, and a water valve carried by the air valve.

8. A dry pipe valve comprising a casing providing an upwardly-extending waterway and containing a slanting air valve seat and a transversely-extending water valve seat, said seats being located one above the other with the waterway passing through both of them, a pivotally-mounted arm located outside of the valve seats and movable toward and away from the latter, an air valve carried by said arm, and a water valve carried by the air valve.

9. A dry pipe valve comprising a casing providing an upwardly-extending waterway and containing a slanting air valve seat and a transversely-extending water valve seat, said seats being located one above the other with the waterway passing through both of them, an arm located outside of the valve seats and mounted to swing on a pivotal axis located below the water valve seat and adjacent to the waterway, an air valve carried by said arm, and a water valve carried by the air valve.

10. A dry pipe valve comprising a casing; a water valve and an air valve constructed and arranged to constitute a single valve structure; and valve carrying means pivotally connecting said valve structure to the casing having an axis, about which the valve structure swings, located below the plane of the water valve and vertically below the air valve.

11. A dry pipe valve comprising a casing providing an upward extending waterway; an air valve arranged to be seated at an inclination with respect to the waterway; a water valve extending across the waterway and arranged to be seated at an angle with respect to the air valve; and valve carrying means pivotally connecting said valves to the casing and having an axis, about which the valves swing, below the planes of the seats of both valves.

12. A dry pipe valve comprising a casing, a water valve and an air valve greatly exceeding the water valve in area and set at an angle therewith, and valve carrying means therefor adapted to guide the valves out of the water way in short course, restricted in height to less than the height required for swinging of a valve about a pivot set in the plane of the seat of that valve, the said greater air valve being in the lead of the water valve by virtue of its said angle and thereby expediting its over-balancing.

13. A dry pipe valve comprising a casing providing an upward extending waterway, and containing a water valve seat and a slanting air valve seat whose plane makes an acute angle with the axis of the waterway; a water valve and an air valve arranged to be seated by gravity; a pivotal mounting means for said valves, having an axis below the plane of the air valve seat and within the acute angle it forms with the axis of the waterway; said means being adapted, upon unseating of the valves, to guide them in a short restricted path to a position outside of the waterway.

ALBERT J. LOEPSINGER.

Witnesses:
J. H. THURSTON,
E. E. TANNER.